Jan. 23, 1940.　　　A. VIGNE ET AL　　　2,187,958
HOT BOX ALARM
Filed Feb. 18, 1939　　　2 Sheets-Sheet 1
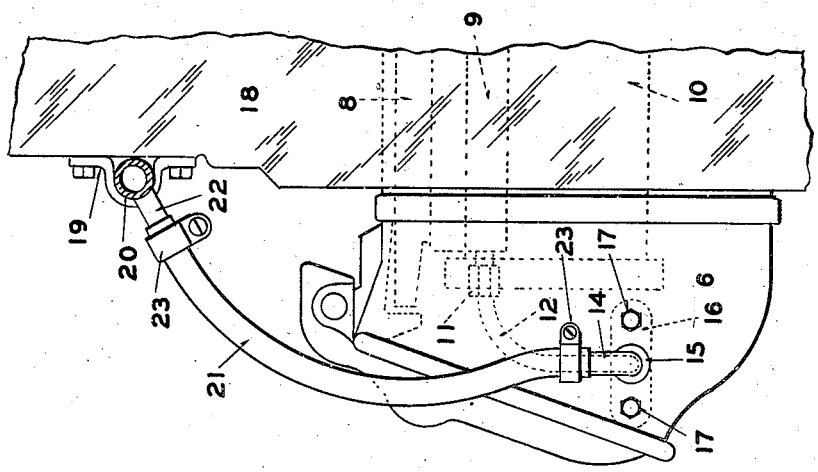
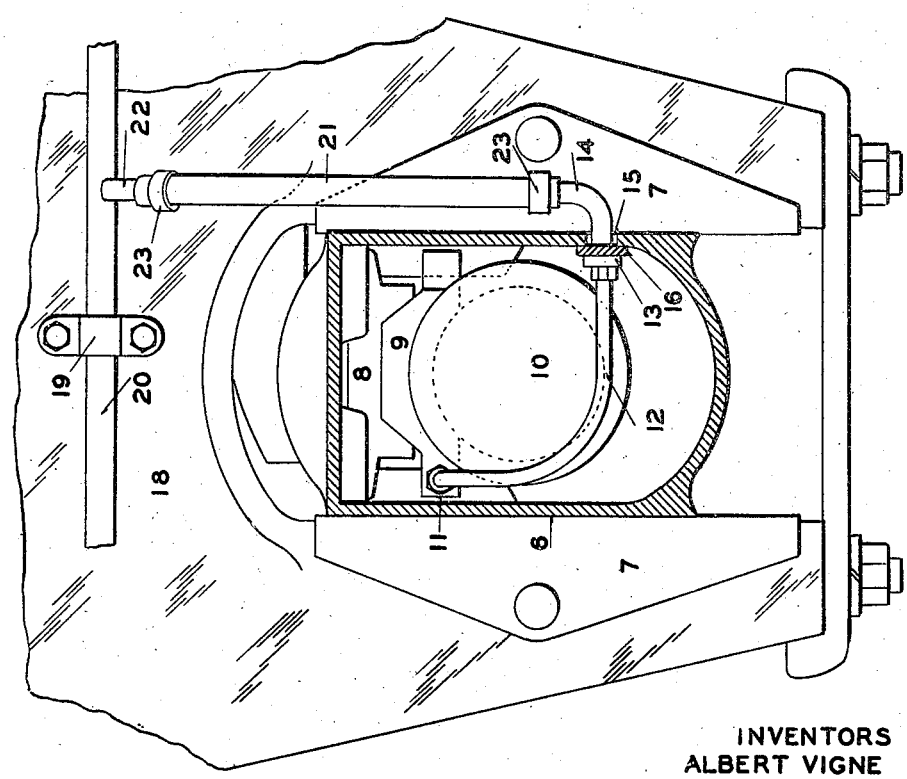
INVENTORS
ALBERT VIGNE
I. EUGENE COX
BY
ATTORNEY Jan. 23, 1940.　　　　A. VIGNE ET AL　　　　2,187,958
HOT BOX ALARM
Filed Feb. 18, 1939　　　2 Sheets-Sheet 2
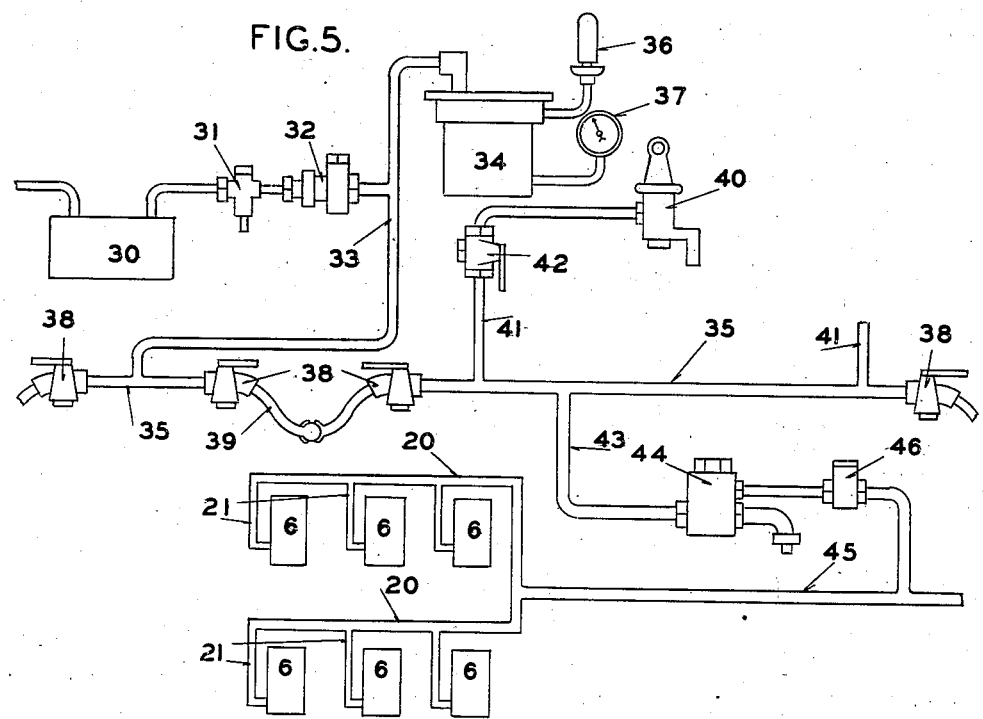
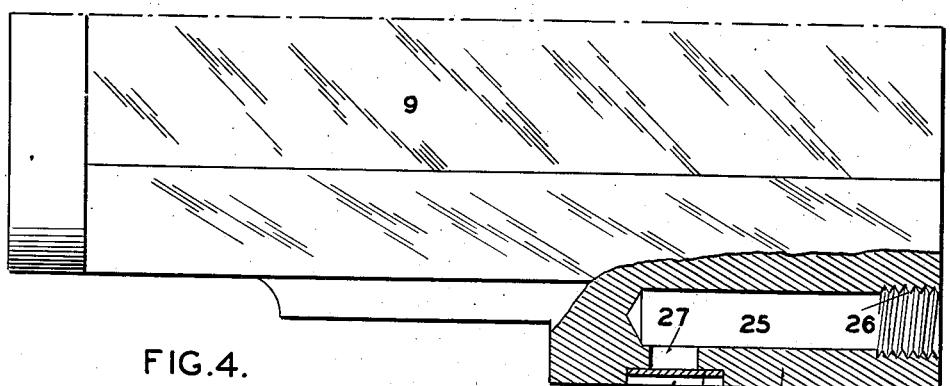
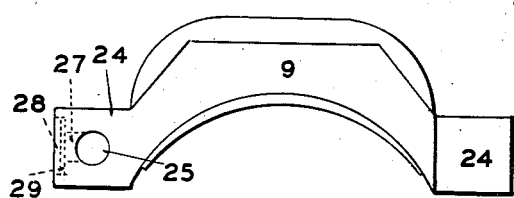
INVENTORS
ALBERT VIGNE
I. EUGENE COX
BY
ATTORNEY Patented Jan. 23, 1940

2,187,958

UNITED STATES PATENT OFFICE 2,187,958

HOT BOX ALARM

Albert Vigne, Webster Groves, and Isaac Eugene Cox, Kirkwood, Mo., assignors to National Bearing Metals Corporation, St. Louis, Mo., a corporation of New York Application February 18, 1939, Serial No. 257,060

2 Claims. (Cl. 246—169)

Our invention relates to alarms for overheated bearings in general, and in particular to journal bearings in railway passenger service provided with air signal equipment.

The danger attendant on overheated bearings or what is known as hot boxes in railway rolling stock has long been recognized and various forms of heat responsive means have been devised to either give an alarm, audible or visual, or to automatically set the brakes. The latter expedient, particularly in passenger trains traveling at high speed, is dangerous and may prove as disastrous in consequences as the hot box itself. Further, the heat responsive element has usually been applied to the journal box or bearing housing with the result that it cannot be depended upon to function at a specific temperature of the brass or bearing proper. We have found by experiment that the temperature of the wedge lags behind that of the brass and the temperature of the box lags behind that of the wedge. Further, this lag is not uniform but varies with the temperature of the surrounding atmosphere. It is evident, therefore, that to secure accurate and dependable results the heat responsive element must be applied directly to the brass.

One object of our invention is to provide heat responsive means applied directly to the brass, which means will operate to give a signal without the intervention of an electric circuit or the like, thus not only reducing the cost of manufacture but rendering the device more dependable.

Another object of our invention is to provide heat responsive means which will function in connection with standard air signal equipment, thus greatly reducing the cost of installation.

A further object of our invention is to so apply the heat responsive device to a brass that it will be interchangeable with the standard A. A. R. brass.

In the accompanying drawings which illustrate one form of hot box alarm made in accordance with our invention: Figure 1 is a front elevation, partly in section; Figure 2 is a side view; Figure 3 is a top view of one-half of the brass, partly in plan and partly in section; Figure 4 is an end view of the brass; and Figure 5 is a diagrammatic view showing the manner of applying our device to a standard air signal system.

Referring first to Figures 1 and 2, the journal box 6 is mounted in pedestals 7. The box is provided with a wedge 8 and brass 9, the latter bearing on the axle 10. The brass is provided with a heat responsive device, hereinafter described in detail, which is connected by a fitting 11 with a flexible tube 12 extending across the box in front of the axle and connected by means of a fitting 13 with an elbow 14 extending through an opening 15 in the side of the box. The fitting 13 is supported by a bracket 16 secured to the box by bolts 17. Secured to the truck 18 by brackets 19 is a manifold 20 which communicates with a flexible tube 21. This tube is connected to the elbow and to a nipple 22 on the manifold by hose clamps 23.

Referring to Figures 3 and 4, the brass 9 differs from a standard A. A. R. brass in having one of its thrust lugs 24 extended to the front end of the bearing. Formed in this extended lug is a bore 25 having internal threads 26 to engage the fitting 11. Communicating with the bore 25 is a lateral vent 27 having a counterbore 28 which forms a seat for a thin copper or brass disk 29. This disk is soldered in place by a fusible alloy having the desired melting temperature, for example, about 360 degrees F. which has proved satisfactory in practice. We have found that if a fusible cap or plug is located so that a part of it is appreciably closer to the journal than the rest, such near part may fuse first, providing a leak. The air escaping through such leak cools the cap or plug, thus delaying the fusing action to such an amount as to endanger the proper operation of the device. With our construction the plane of the disk is practically parallel with the bore of the bearing so that all the fusible metal melts simultaneously and the disk is blown off by the signal line pressure, providing instant and complete opening of the vent. The extension of the thrust lug does not interfere with any part of a standard A. A. R. journal box structure and consequently our brass is interchangeable with a standard A. A. R. brass, a feature which is essential to the commercial application of our invention.

In Figure 5 we have shown our invention as applied to a standard air signal system. In this figure numeral 30 indicates the main reservoir on the locomotive supplied with air from a compressor (not shown). Air from the reservoir passes through a reducing valve 31 where its pressure is reduced to a standard amount, usually forty-two pounds per square inch. From the reducing valve the air passes through a combined strainer and check valve 32 to a branch pipe 33. One arm of the pipe is connected to the locomotive signal valve 34 and the other to the train signal pipe 35. The locomotive signal valve is provided with a whistle 36 and a pressure gauge 37. The signal pipe is provided with the usual angle cocks 38 and coupling hose 39. The car signal valves 40 (only one shown) are connected to the train pipe by branches 41 each provided with a stop cock 42. A signal is given by our device through reduction of pressure in the train pipe, the air being discharged through branch pipe 43 when the vent 27 of one of the bearings is opened by excessive heat. Due to the shape and size of the brass, these vents cannot be made of sufficient size to discharge enough air to insure the prompt action of the signal if they are connected directly to the pipe 43. This pipe is, therefore, provided with a relay valve 44 of well-known construction which is actuated by means of a pipe 45 connected to the manifold 20. A check valve 46 is preferably placed in pipe 45 to retain signal air pressure in pipe 45 and manifolds after signal pressure is reduced in the train pipe as may occur in breaking train connections during car switching.

The operation of our device is as follows. When the train is made up, the signal and alarm system is charged with air pressure from reservoir 30, the pressure in all the connections beyond valve 31 being reduced to the normal pressure which is usually forty-two pounds per square inch. When a bearing becomes overheated, the fusible solder holding disk 29 on its seat will be melted. The signal air pressure will now force the disk out of the counterbore, opening the alarm vent to atmosphere and reducing the pressure in pipe 45. This loss of pilot pipe pressure will cause the pressure in pipe 43 to raise relay valve 44. This results in a rapid discharge of air which will reduce the pressure in the entire signal line. This is because valve 31 is designed to feed a lesser volume of air than is discharged through the open alarm system. The action of the reducing valve 31 in recharging the line causes slight alternate increase and decrease of pressure in the signal line. This fluctuation in pressure acts on the signal valve 34 to cause the whistle 36 to blow one long blast and then a series of short blasts. The gauge 37 gives a visual indication of the line pressure. It also enables the engineer to differentiate between a broken coupling and a hot box alarm. If the pressure gauge in the brake pipe line (not shown) indicates a corresponding reduction of pressure, he knows it results from a broken coupling; if not, it is a true bearing alarm.

Having fully described our invention, what we claim as new and desire to secure by Letters Patent of the United States is:

1. In an alarm device for heated bearings, a signal system, a brass having one of its thrust lugs provided with a longitudinally extending air passage, a lateral vent for said passage closed by a disk secured in position by fusible solder, said disk lying in a plane substantially parallel with the bearing bore, and connections between said passage and the signal system for reducing pressure in the latter when the disk is released by melting of the solder.

2. In an alarm device for heated bearings, a brass having one of its thrust lugs provided with a longitudinal air passage extending parallel with the bearing bore, a lateral vent for said passage, a counter-bore for said vent forming a seat lying in a plane substantially parallel with the bearing bore, a disk secured on said seat by fusible solder, and means for connecting said passage with a signal system.

ALBERT VIGNE.
I. EUGENE COX.